HARRY J. PENDER
INVENTOR

BY *Milton L. Simmons*
ATTORNEY

United States Patent Office 3,159,467
Patented Dec. 1, 1964

3,159,467
APPARATUS FOR DRYING DISCRETE PARTICLES
Harry J. Pender, Parma, Ohio, assignor to Ferro Corporation, Cleveland, Ohio, a corporation of Ohio
Filed July 26, 1962, Ser. No. 212,653
2 Claims. (Cl. 34—174)

This invention deals generally with an apparatus for reducing the moisture content of moisture containing particulate matter, and more particularly with a method for drying ceramic frits and frits in the form of a mass of discrete particles; also for drying powdered materials.

As is well known, certain ceramic porcelain enamel, and glaze, frits are manufactured by fusing the constituents into a vitreous mass, at elevated temperatures, then suddenly quenching said mass in a suitable quench medium, usually water. Heat shock shatters the molten mass into solid, friable discrete particles of glass. When water is used as the quench medium, the residual moisture left in the frit after removal from the quench pit must be driven off by some suitable drying means.

Previously, the most widely accepted method of drying frit was by the use of a kiln type rotary dryer consisting essentially of a long, tubular housing inclined at an angle of approximately 10 to 15 degrees with the horizontal, said dryer having a gas, or oil burner centrally positioned at its lower end and in such a manner that the flame from said burner extended into said dryer, heating the interior thereof, said dryer adapted to be continually rotated about its axis, to effect drying of frit introduced into the elevated end of said rotating dryer, the frit being tumbled toward the lower end of the dryer and out, being dried by the heat from said gas or oil burner.

Because of the more strict quality requirements imposed by modern end uses of ceramic frits, the older method described above is no longer suitable for a number of reasons.

First, the capacity of such type dryer is limited due to space requirements; that is, to increase capacity, the length of the individual dryers would have to be extended beyond practical limits for modern frit manufacturing facilities.

Too, extreme difficulty is experienced in attempting to closely control and regulate the ambient temperature throughout the old type dryer, so that some portions of the frit batch to be dried are subjected to more severe heat exposure than others. This resulted in an adverse effect upon the finished characteristics of said frits as to color stability over a firing range, etc. Further, because of the intensity of the heat in certain zones of the rotary type dryer, there was a tendency to build up a layer of soluble salts, literally boiled from the frit being dried, around the interior of the rotary type dryer, necessitating periodic shutdowns for removal of such deposits. Furthermore, exposure of moist frit to the open frame was undesirable as products of combustion tended to deposit on the frit, adversely affecting its quality.

It is therefore an object of this invention to provide a new and improved dryer for particulate material.

It is also an object of this invention to provide a dryer for reducing the moisture content of discrete particles wherein there is no direct flame impingement upon said particles.

It is also an object of this invention to provide a dryer for reducing the moisture content of particulate material, said dryer adaptable to have said particulate material dried while the particles are in gravity compacted relationship to each other, said dryer capable of smooth and continuous discharge of said particles along with maximum freedom from stoppages resulting from agglomeration of particles.

It is a further object of this invention to provide ceramic frit, dried by my novel apparatus.

Briefly stated, the preferred embodiment of my invention comprises a substantially vertical cylindrical housing, open at the top, and having extending parallel to the longitudinal axis of said housing, a multiplicity of perforate ducts for introducing hot air into said housing, an exhaust duct centrally located within said housing, an interior exhaust jacket girdling said housing in the form of a circular manifold with a multiplicity of exhaust ducts emanating therefrom, with a suitable means for introducing moisture-containing frit into the top of said housing, progressively moving same through said housing and discharging same from the bottom thereof, said frit having moisture removed therefrom during its passing through said housing by virtue of continual circulation, throughout the mass, of hot dry air introduced through the aforementioned duct work with continual removal of air containing liberated moisture from said frit taking place through the centrally and peripherally located exhaust ducts.

In the drawings, FIG. 1 is a front elevation view of a preferred embodiment of my invention.

Figure 1:
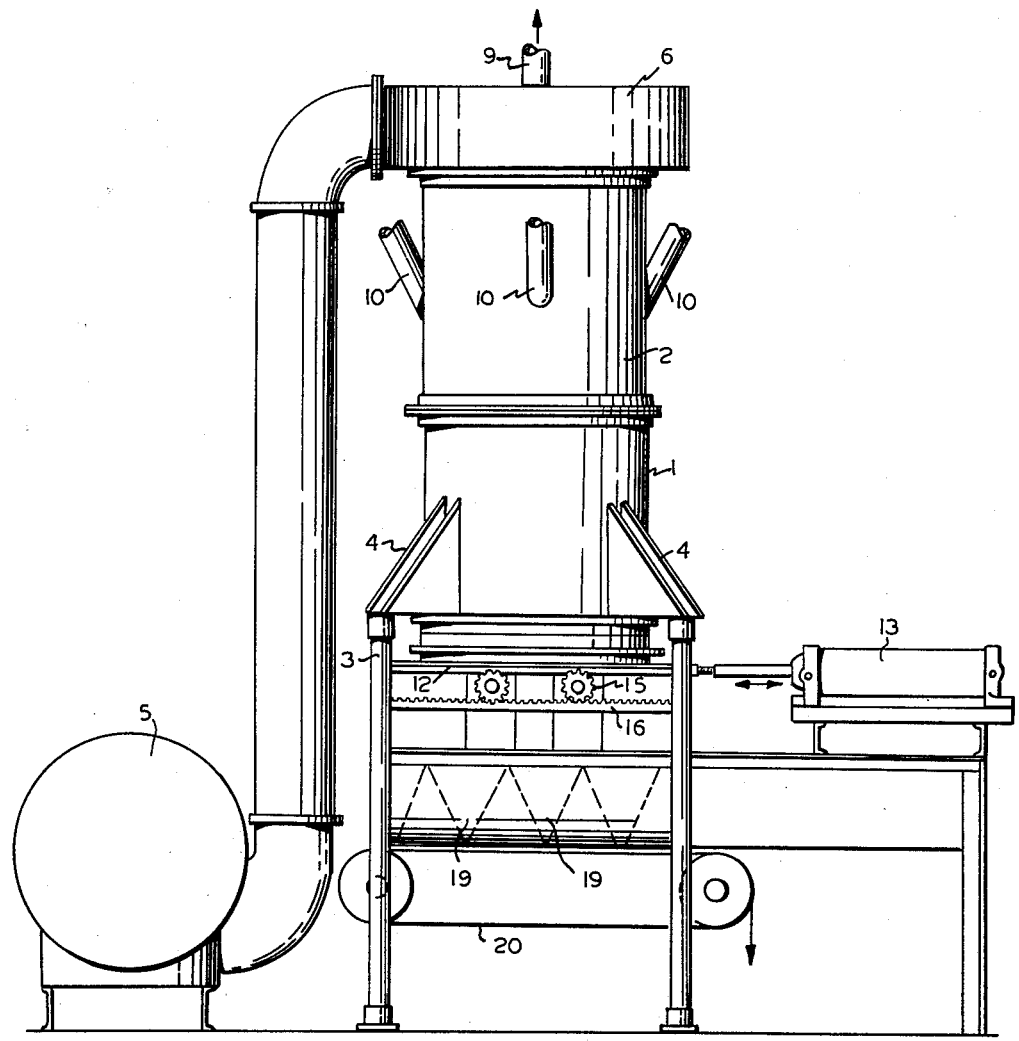

Referring now more specifically to the drawings, in FIG. 1, the numeral 1 indicates the dryer generally, 2 indicates a cylindrical sheet metal housing forming the body of the dryer which is suitably supported on frame 3 having braces 4 maintaining housing 2 in a substantially vertical, fixed position.

A blower 5 connected to a suitable source of hot dry air, not shown, delivers hot air to hot air duct manifold 6 shown in FIG. 1.

Figures 2, 3:
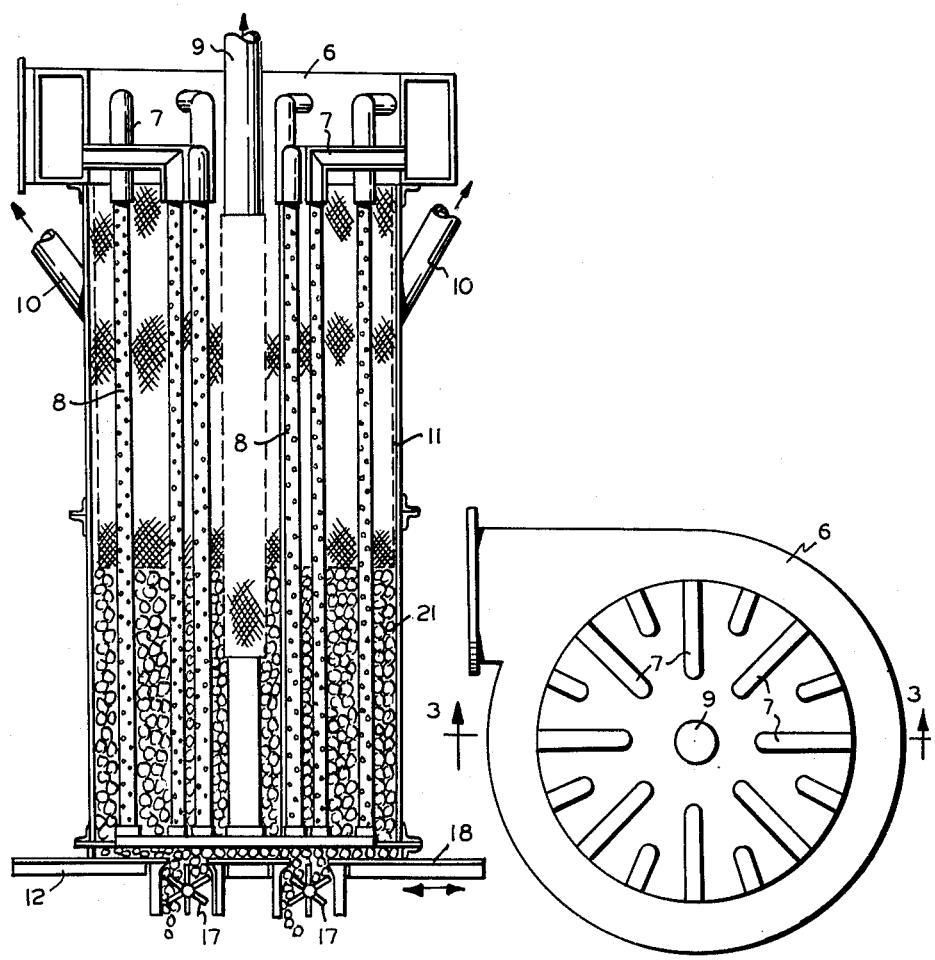
FIG. 2 is a plan view of the cylindrical housing of FIG. 1.
FIG. 3 is a section through the line 3—3 of FIG. 2.

Referring to FIGS. 2 and 3, it will be seen that manifold takeoffs 7 receive hot air from hot air manifold 6 and direct same downwardly through the perforate hot air ducts 8 shown in FIG. 3.

In FIGS. 1, 2, and 3, centrally located exhaust duct 9, with suitable screening forming its mid-section portion to prevent exhaust of particulate matter, in conjunction with hot air ducts 8, effects a constant circulation of hot dry air into and out of the dryer, with attendant removal any moisture liberated from particulate matter passed through said dryer. The action of centrally located exhaust duct 9 is aided by a multiplicity of exhaust ducts 10 which communicate with an interior screened zone girdling the interior of said dryer, which consists essentially of relatively stiff screening 11 circumferentially placed around the interior of said housing, and spaced away from the interior surface thereof to permit the free circulation of air between said screening and said housing, removal thereof through exhaust ducts 10, which, as will be apparent, exhaust moist air in the direction indicated by the arrows. Exhaust ducts 10 and 9 are connected to any suitable, conventional means, not shown, for pulling air from the interior of said dryer.

Figure 4:
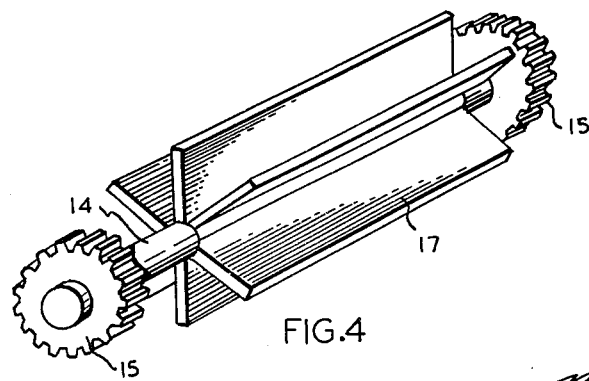
FIG. 4 is a perspective view of one of the components of the discharge mechanism of the apparatus depicted in FIG. 1.

Fitting snugly against the bottom of said circular housing is frame 12, which, as indicated in FIG. 1, may be reciprocated in a horizontal plane by hydraulic cylinder 13, which may be adjusted as to cycle and stroke by any conventional means not shown. Suitably journaled in said frame are two vaned members indicated generally by 14 in FIG. 4. In my preferred embodiment, as will be seen from FIG. 1, pinions 15 are geared to racks 16.

Thus, as will be obvious, reciprocal motion of frame 12 moves vaned members 14 reciprocally back and forth across the bottom of the dryer, at the same time the rack and pinion arrangement imparts a rotating motion to members 14 as they are reciprocated.

In FIG. 3 it will be seen that compartments are formed by vanes 17 of rotating member 14 permitting particulate material 21 to fall by gravity into these compartments as rotating members 14 are passed back and forth in their reciprocal motion. As will be seen from FIG. 3, as the rotating member rotates, a full compartment is moved out of direct communication with the interior of the dryer causing the particulate material in each compartment to be dropped as that compartment is rotated to its lowermost position.

As shown in FIG. 3, there is a plate 18, covering the top of the frame 12, having dimensions to fully cover the bottom of housing 2 of the dryer, to hold the material to be dried inside the dryer. Said plate has openings in the top extending the full width of the dryer, said openings being just wide enough, as shown in FIG. 3, to permit particulate material to move through the openings in plate 18 and into the vanel compartments of rotating members 14.

Thus, in operation, periodic or continual charges of moisture-containing discrete particles 21 may be fed by a suitable means directly into the top of the housing 2 of my novel dryer, the initial charge may be held within the confines of the dryer long enough ot effect removal of moisture from particulate materials through the introduction of hot air through perforate ducts 8, and evacuation of moisture-containing air through exhaust ducts 9 and 10. During this phase the reciprocating frame 12 would be held stationary. Once a charge of material has been adequately dried, reciprocating frame 12 would be placed in motion and its speed regulated to provide the desired rate of discharge of dried material from the dryer. After drying of an initial charge, discrete particulate material 21 may then be fed into the dryer continuously, with continuous removal of same as shown.

The unique discharge device serves several purposes:

First, it provides a means for regulating the discharge rate of the dryer, regardless of whether the material to be dried is fed periodically or continuously into the dryer.

Secondly, the agitation created by the rotating vanes as they are reciprocated back and forth across the bottom of the mass of discrete particles to be dried, tends to break up agglomerates, and obviates the need for vibrators, agitators, or other means of preventing agglomeration or "caking" of the discrete particles.

Finally, the reciprocating stroke of frame 12 and rotating members 14 is such that material is discharged from the driver evenly and uniformly, rather than having "dead areas" build up in certain sections as would happen if the material were permitted to discharge through a single, funnel-shaped opening at the bottom of the dryer. Reciprocating frame 12 and rotating members 14 move quantities of frit evenly from the center of the dryer, as well as from the wall area.

Having described basically the operation of my novel dryer, reference is had to FIG. 1, wherein is shown a series of generally wedge-shaped hoppers 19, disposed beneath the area covered by the reciprocating frame 12, which receive frit descending from the rotating members 14 and deposit same on conveyor belt 20 moving in the direction indicated in FIG. 1. Conveyor 20 then carries the dried material away from the vicinity of hoppers 19 and deposits said material in any suitable surge hopper or other device for subsequent transport to a permanent storage bin or packaging area.

Although my preferred embodiment shows a hot air system of introducing heat into my dryer, it will be readily seen that any flameless means of introducing heat into the dryer, such as steam coils, electrical resistance elements, or enclosed heat exchangers which eliminate products of combustion from the dryer atmosphere, could be used to achieve the same purpose. And, while I have utilized exhaust ducts, it is contemplated that if the dryer were made shallower so that its total depth with respect to its diameter was much less than shown in my preferred embodiment, natural convection currents would be sufficient to remove moisture from the open top of said dryer.

Although my preferred embodiment is vertical, it is contemplated that the main housing of the dryer could be established at any tuitable convenient angle, so long as the primary motivating force for urging the material to be dried through the drying area of said dryer was gravity.

As is well known, many of the raw powdered materials used for frit batching, prior to smelting, are susceptible to moisture pick-up which is undesirable as inaccuracies in batching result from weighing an unknown amount of water along with the material (borax, soda ash, etc.). Too, after the various frit components have been weighed and mixed, the batch, upon standing tends to acquire moisture which is undesirable in that agglomerations tend to form in feeding and smelting equipment causing stoppages, uneven smelting, etc.

Thus, following the procedure for frit outlined above, my novel drying apparatus has been used to quickly and efficiently dry both individual raw frit batch components, as well as frit batches comprising admixed raw materials well known in the art.

I claim:

1. An apparatus for drying wet discrete particles of frit comprising a stationary enclosure having a passage extending therethrough, said passage having an entrance at one end thereof to receive a mass of discrete particles for movement therethrough along a path substantially parallel to the longitudinal axis of said passage, means including a blower connected to a source of hot, dry air, a manifold disposed about said passage entrance and communicating with said blower for conducting dry air to said passage entrance, a plurality of perforate air inlet ducts connected to said manifold and disposed in said passage, said ducts extending substantially the entire length of said passage and arranged generally parallel to the longitudinal axis of said passage for the introduction of said hot, dry air thereinto, at least one perforate exhaust duct which is disposed in said passage and communicating therewith through which moisture laden air is exhausted from said passage, a relatively stiff perforate member disposed within said passage and arranged circumferentially around the inner wall of said enclosure being spaced therefrom to provide a space for free circulation of air between said perforate member and said enclosure wall, said perforate exhaust duct communicating with said space and said passage for the discharge of said moisture laden air therefrom, said passage having an outlet opening through which dried discrete particles of said frit are discharged, means comprising a reciprocable flat plate disposed over and arranged to cover said outlet opening, said plate means having an aperture therein which is substantially of the same size of said outlet opening, a rotatable member mounted on said plate means, said rotatable member comprising a shaft having at least four vanes integral therewith and extending radially outwardly from the longitudinal axis of said shaft, said vanes being adapted to substantially close said aperture when opposed vanes are rotated to a position coincident with the surface of said plate means, a longitudinally reciprocable frame member, said rotatable member being journalled in said plate means and said plate means being fixed to said reciprocable frame member, a pinion gear secured on the shaft of said rotatable member, a gear toothed rack disposed on said reciprocable frame which is adapted to engage said pinion gear whereby upon reciprocation of said frame member, said shaft and vanes thereon are rotated in said outlet opening to cause the discharge of dried discrete particles of said frit outwardly from said passage.

2. The apparatus of claim 1 wherein said passage consists of the interior of a substantially vertical cylinder having walls of sheet metal, the entrance to said passage being at the top thereof with the discharge opening thereof being at the bottom, and the particulate material to be dried being moved downwardly through said passage under the force of gravity.

References Cited by the Examiner

UNITED STATES PATENTS

| | | | |
|---|---|---|---|
| 209,589 | 11/78 | Smith et al. | 34—174 |
| 638,429 | 12/99 | Tweedale et al. | 34—174 |
| 1,276,044 | 8/18 | Ellis | 34—174 |
| 1,424,565 | 8/22 | Goskar | 34—174 X |
| 2,490,097 | 12/49 | Seaman | 34—174 |
| 3,047,473 | 7/62 | Schmidt | 34—174 X |

NORMAN YUDKOFF, *Primary Examiner.*